United States Patent
Rene

(10) Patent No.: US 9,643,639 B1
(45) Date of Patent: May 9, 2017

(54) STAIR-CLIMBING HAND TRUCK

(71) Applicant: Wayne Rene, Warren, RI (US)

(72) Inventor: Wayne Rene, Warren, RI (US)

(*) Notice: Subject to any disclaimer, the term of this patent is extended or adjusted under 35 U.S.C. 154(b) by 0 days.

(21) Appl. No.: 15/051,725

(22) Filed: Feb. 24, 2016

(51) Int. Cl.
| | |
|---|---|
| *B62B 5/02* | (2006.01) |
| *B62B 5/06* | (2006.01) |
| *B62B 3/00* | (2006.01) |

(52) U.S. Cl.
CPC ............. *B62B 5/026* (2013.01); *B62B 3/008* (2013.01); *B62B 5/06* (2013.01)

(58) Field of Classification Search
CPC  B62B 5/02; B62B 5/021; B62B 5/026; B62B 3/008
See application file for complete search history.

(56) References Cited

U.S. PATENT DOCUMENTS

| | | | |
|---|---|---|---|
| 2,605,117 A * | 7/1952 | Hooz ................. | B62B 3/12 248/354.5 |
| 3,061,323 A | 10/1962 | Martin | |
| 3,494,440 A | 2/1970 | Ubert | |
| 3,512,658 A * | 5/1970 | Harlan ................ | B62B 5/02 180/9.22 |
| 3,515,401 A | 6/1970 | Eshcol | |
| 3,693,996 A * | 9/1972 | Hardy ................ | B62B 1/002 280/47.34 |
| 4,109,740 A | 8/1978 | Andruchiw | |
| 6,341,788 B1 * | 1/2002 | Ciccone .............. | B25H 1/00 280/47.28 |
| 6,398,477 B1 * | 6/2002 | Fox .................... | B66F 9/06 414/490 |
| 7,137,464 B2 | 11/2006 | Stahler, Sr. | |
| 7,628,408 B2 * | 12/2009 | Kolesa ................ | B62B 3/08 280/47.27 |
| D644,400 S | 8/2011 | Wood | |
| 8,820,756 B2 * | 9/2014 | Hronyetz ........... | B62B 3/02 280/43.1 |
| 2008/0272563 A1 * | 11/2008 | Tsai .................... | B62B 3/008 280/38 |

FOREIGN PATENT DOCUMENTS

GB  2167360 A * 5/1986 ............. B62B 5/025

* cited by examiner

*Primary Examiner* — Kevin Hurley
(74) *Attorney, Agent, or Firm* — Kyle A. Fletcher, Esq.

(57) ABSTRACT

The stair-climbing hand truck is an improved hand truck that includes a back plate with a plurality of secondary wheels that may be used to roll the hand truck along a floor surface or up or down a flight of stairs. The back plate is rigidly affixed to the vertical frame of the hand truck. Moreover, the back plate is acutely oriented behind the vertical frame. The back plate has at least one wheel on opposing sides, which adaptively interact with a ground surface to roll the entire assembly. The vertical frame and the back plate are supported with primary wheels that are located adjacent to where the vertical frame meets a load plate. The primary wheels have a diameter larger than the wheels of the back plate.

15 Claims, 5 Drawing Sheets

STAIR-CLIMBING HAND TRUCK

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

The present invention relates to the field of dollies and hand trucks, more specifically, a hand truck that is able to climb stairs.

SUMMARY OF INVENTION

The stair-climbing hand truck is an improved hand truck that includes a back plate with a plurality of secondary wheels that may be used to roll the hand truck along a floor surface or up or down a flight of stairs. The back plate is rigidly affixed to the vertical frame of the hand truck. Moreover, the back plate is acutely oriented behind the vertical frame. The back plate has at least one wheel on opposing sides, which adaptively interact with a ground surface to roll the entire assembly. The vertical frame and the back plate are supported with primary wheels that are located adjacent to where the vertical frame meets a load plate. The primary wheels have a diameter larger than the wheels of the back plate.

It is an object of the invention to provide a hand truck that includes a plurality of wheels on a back plate that can be used to aid in moving the hand truck up and down a flight of stairs or to alternatively support the assembly in conjunction with a primary set of wheels.

These together with additional objects, features and advantages of the stair-climbing hand truck will be readily apparent to those of ordinary skill in the art upon reading the following detailed description of the presently preferred, but nonetheless illustrative, embodiments when taken in conjunction with the accompanying drawings.

In this respect, before explaining the current embodiments of the stair-climbing hand truck in detail, it is to be understood that the stair-climbing hand truck is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the stair-climbing hand truck.

It is therefore important that the claims be regarded as including such equivalent construction insofar as they do not depart from the spirit and scope of the stair-climbing hand truck. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
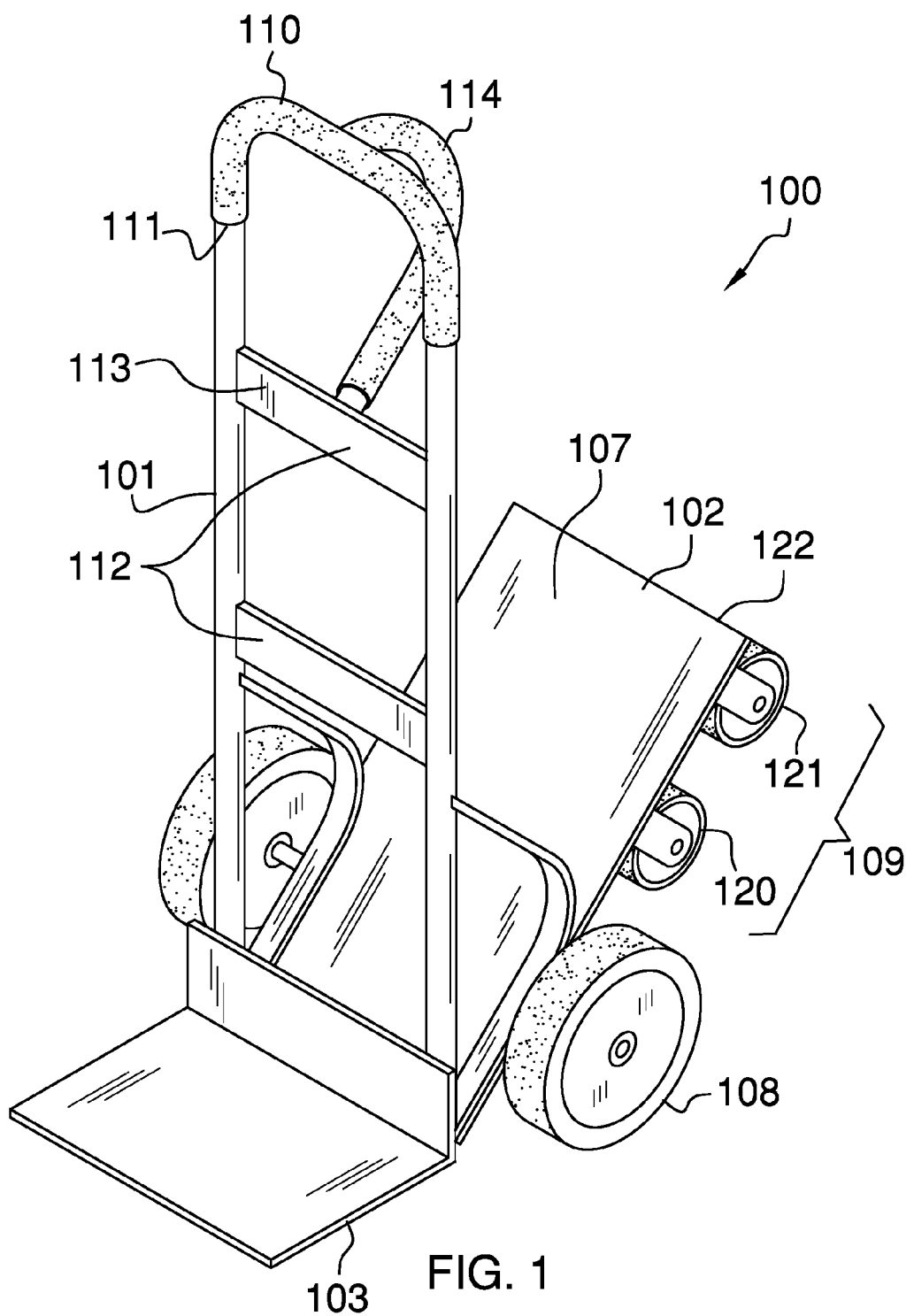
FIG. 1 is a perspective view of an embodiment of the disclosure.
Figure 2:
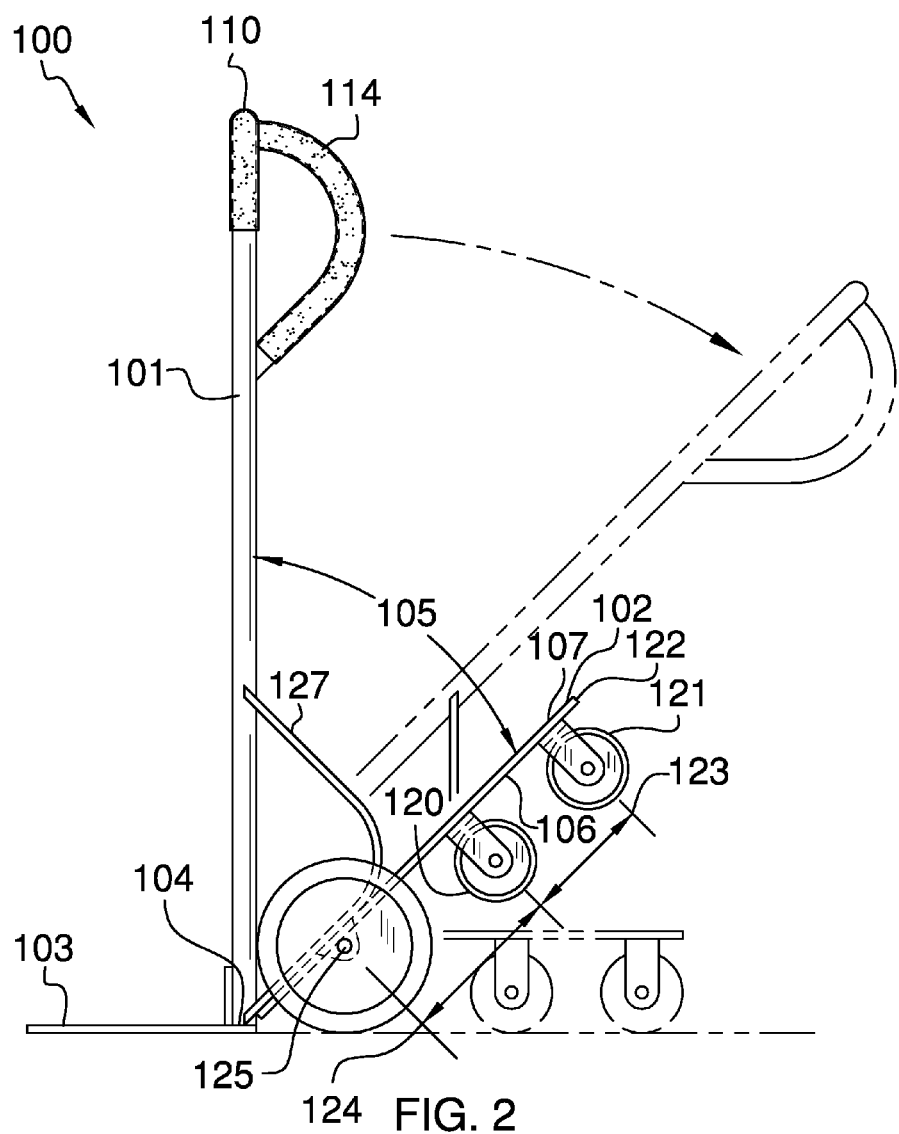
FIG. 2 is a side view of an embodiment of the disclosure.
Figure 3:
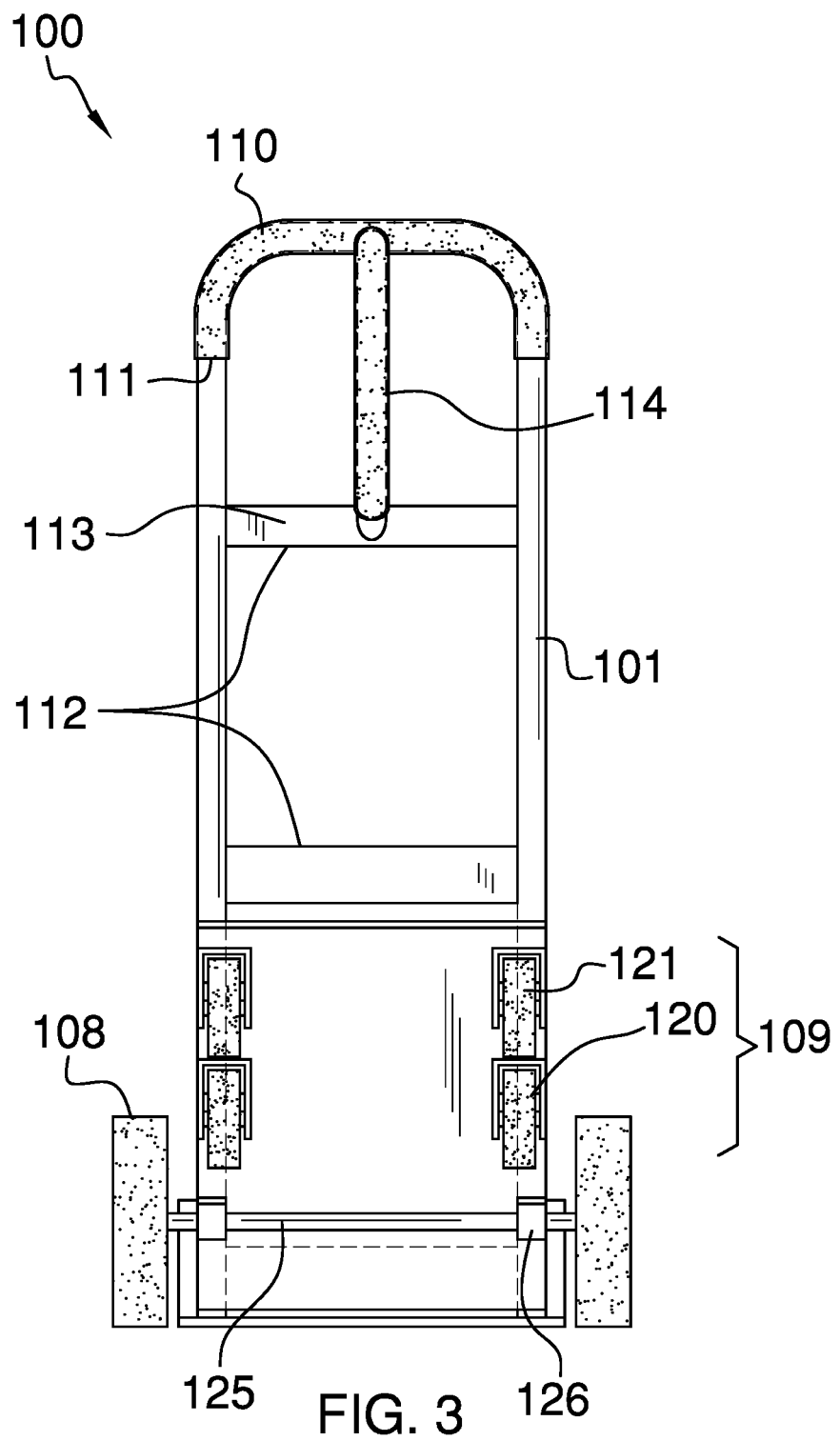
FIG. 3 is a back view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 5. The stair-climbing hand truck 100 (hereinafter invention) comprises a vertical frame 101, a back plate 102, and a load plate 103. The load plate 103 is perpendicular with respect to the vertical frame 101. The load plate 103 is affixed to the vertical frame 101 at a first distal end 104. The load plate 103 and the vertical frame 101 are adapted to support and transport an object 200.

The back plate 102 extends upwardly at an acute angle 105 with respect to the vertical frame 101. The back plate 102 is a planar object that is further defined with a first back surface 106 and a second back surface 107. The first back surface 106 is opposite of the second back surface 107. The first back surface 106 extends downwardly, and is affixed to a primary set of wheels 108 as well as at least one set of secondary wheels 109. The primary set of wheels 108 is closest to the vertical frame 101. Moreover, the primary set of wheels 108 has a diameter greater than a diameter of the at least one set of secondary wheels 109.

The primary set of wheels 108 are more commonly used when moving the invention 100 and the object 200. The vertical frame 101 includes a handle 110 at a second distal end 111 of the vertical frame 101. The handle 110 is manually grasped in order to manipulate and operate the invention 100. The vertical frame 101 may employ at least one cross brace 112. A topmost cross brace 113 of the at least one cross brace 112 may connect to a rearward handle 114. The rearward handle 114 extends rearwardly of the vertical frame 101 and connects between the topmost cross brace 113 and the handle 110. The rearward handle 114 simply provides an alternative handle with which to manipulate the invention 100.

The at least one set of secondary wheels 109 is provided away from the primary set of wheels 108. More specifically, the at least one set of secondary wheels 109 are equally spaced away from the primary set of wheels 108 and with respect to the first distal end 104. The at least one set of secondary wheels 109 is used when the invention 100 is tilted rearwardly or in connection with use of the invention 100 and a staircase 400.

Figure 4:
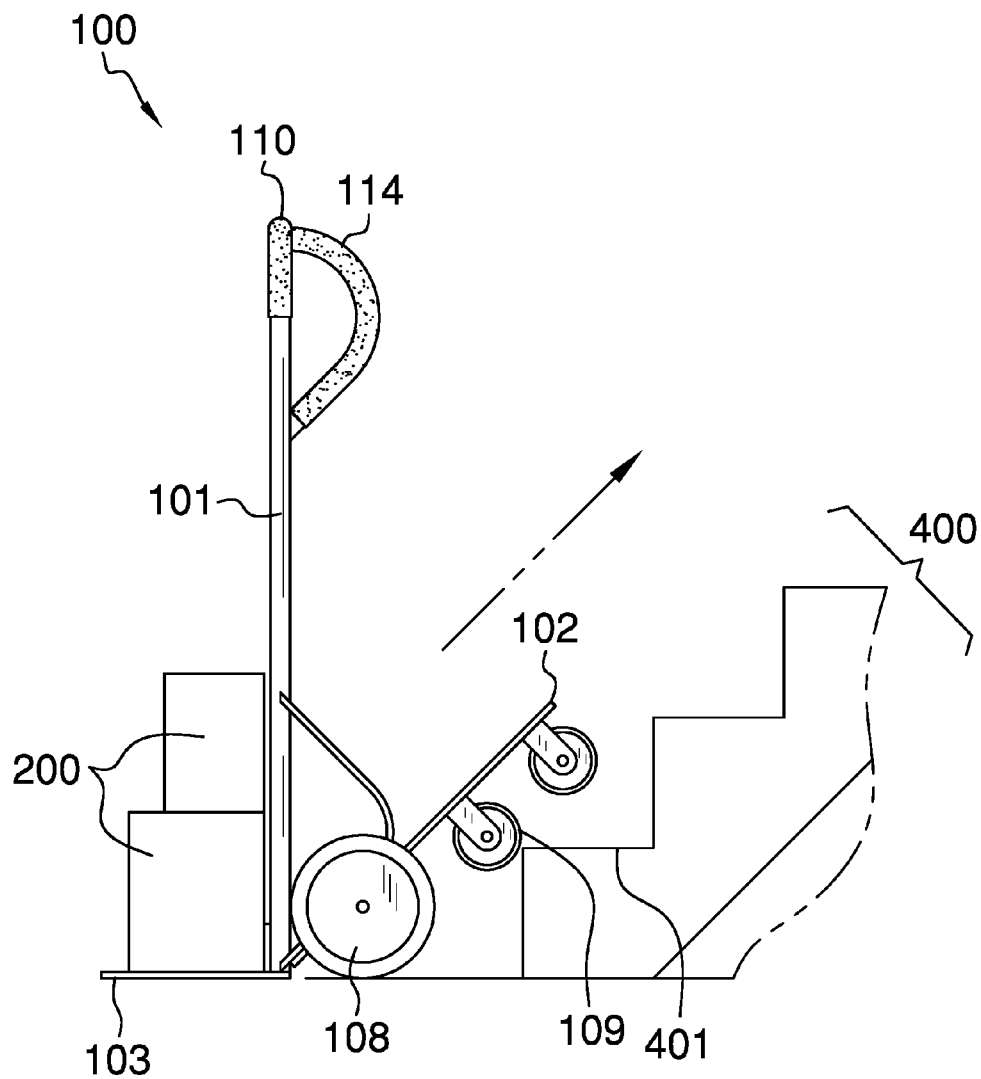
FIG. 4 is a side view of an embodiment of the disclosure in use.

The acute angle 105 formed between the vertical frame 101 and the back plate 102 is able to range from 1 to 89 degrees. However, the figures depict the acute angle 105 at 45 degrees. In FIG. 4, the acute angle 105 mirrors that of the staircase 400 such that the invention 100 is able to simply roll up or down the staircase 400. The at least one set of secondary wheels 109 work in concert with the primary set of wheels 108 to aid in the transition of the invention 100 up or down the staircase 400. Moreover, the at least one set of secondary wheels 109 is able to provide a smooth transition amongst an individual stair 401 out of the set of the staircase 400.

Referring to the FIG. 100, the invention 100 is depicted with two sets of the at least one set of secondary wheels 109. The at least one set of secondary wheels 109 may be referred to as a first wheel set 120 and a second wheel set 121. The second wheel set 121 is closest to a third distal end 122 of the back plate 102. The first wheel set 120 is positioned between the second wheel set 121 and the primary set of wheels 108. The second wheel set 121 is separated a secondary distance 123 from the first wheel set 120. The first wheel set 120 is separated from the primary set of wheels 108 via a third distance 124.

It shall be further noted that the first wheel set 120, the second wheel set 121, and the primary set of wheels 108 are collectively linearly aligned, and work in concert as needed. The primary set of wheels 108 are affixed to a primary axle 125. The primary axle 125 is supported underneath the back plate 102 via a pair of primary brackets 126. It shall be noted that a curved brace 127 may be employed to further rigidify the back plate 102 with respect to the vertical frame 101.

Figure 5:
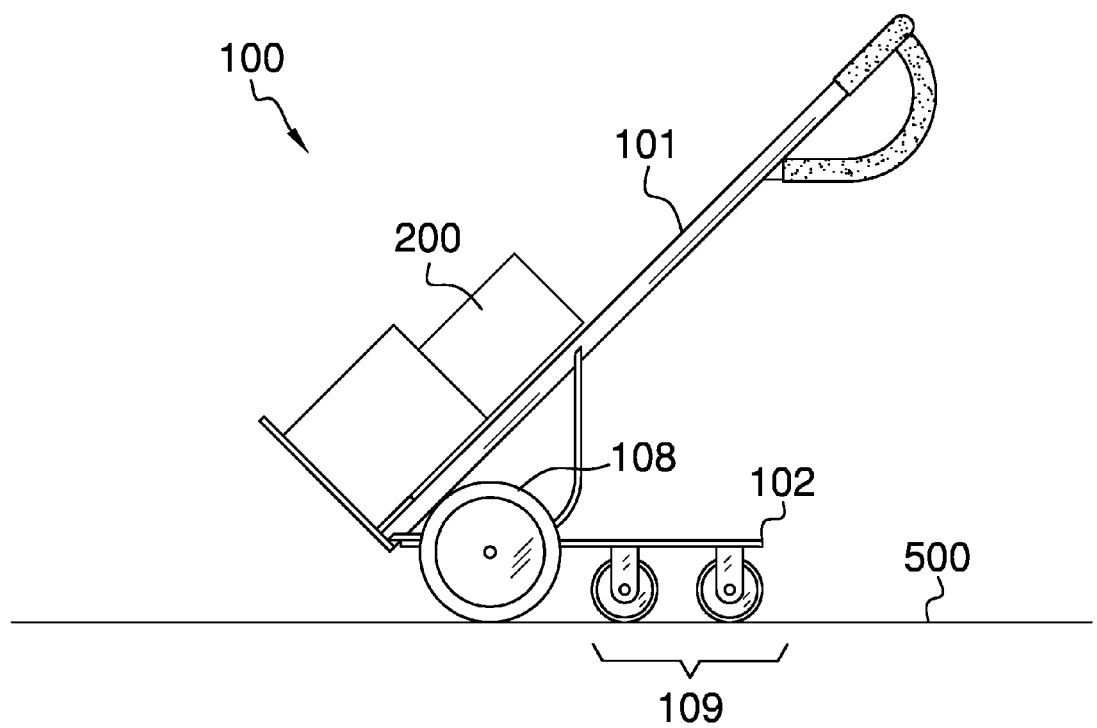
FIG. 5 is a view of an embodiment of the disclosure in use.

Referring to FIG. 5, the invention 100 is also able to be used on a floor surface 500 whereby the at least one set of secondary wheels 109 aid and work in conjunction with the primary set of wheels 108 to mobilize the invention 100 and the object 200. The construction of the invention 100 may utilize materials comprising metal, wood, carbon fiber composite, or plastic. The primary set of wheels 108 and the at least one set of secondary wheels 109 may be made of a material comprising a rubber, plastic, metal, carbon fiber composite, etc.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A stair-climbing hand truck comprising:
 a vertical frame, a back plate, and a load plate;
 wherein the load plate and the vertical frame are adapted to support and transport an object;
 wherein a primary set of wheels and at least one set of secondary wheels are affixed to the back plate;
 wherein the primary set of wheels mobilize the stair-climbing hand truck;
 wherein the at least one set of secondary wheels are adapted to aid in mobilizing the stair-climbing hand truck up or down a staircase;
 wherein the load plate is perpendicular with respect to the vertical frame;
 wherein the load plate is affixed to the vertical frame at a first distal end;
 wherein the back plate extends upwardly at an acute angle with respect to the vertical frame;
 wherein the back plate is a planar object that is further defined with a first back surface and a second back surface; wherein the first back surface is opposite of the second back surface;
 wherein the first back surface extends downwardly, and is affixed to the primary set of wheels as well as the at least one set of secondary wheels; wherein the primary set of wheels is closest to the vertical frame.

2. The stair-climbing hand truck according to claim 1 wherein the primary set of wheels has a diameter greater than a diameter of the at least one set of secondary wheels.

3. The stair-climbing hand truck according to claim 2 wherein the vertical frame includes a handle at a second distal end of the vertical frame; wherein the handle is adapted to be manually grasped in order to manipulate and operate the stair-climbing hand truck.

4. The stair-climbing hand truck according to claim 3 wherein the vertical frame includes at least one cross brace; wherein a topmost cross brace of the at least one cross brace connects to a rearward handle.

5. The stair-climbing hand truck according to claim 4 wherein the rearward handle extends rearwardly of the vertical frame and connects between the topmost cross brace and the handle; wherein the rearward handle is adapted to be manually grasped in order to manipulate and operate the stair-climbing hand truck.

6. The stair-climbing hand truck according to claim 5 the at least one set of secondary wheels is provided away from the primary set of wheels; wherein the at least one set of secondary wheels are equally spaced away from the primary set of wheels and with respect to the first distal end; wherein the at least one set of secondary wheels is optionally used when the stair-climbing hand truck is titled rearwardly and adapted to be moved along a ground surface or ascending or descending the staircase.

7. The stair-climbing hand truck according to claim 6 wherein the at least one set of secondary wheels work in concert with the primary set of wheels to aid in the transition of the stair-climbing hand truck up or down the staircase; wherein the at least one set of secondary wheels is able to provide a smooth transition amongst an individual stair out of the set of the staircase.

8. The stair-climbing hand truck according to claim 7 wherein the at least one set of secondary wheels is further defined as a first wheel set and a second wheel set.

9. The stair-climbing hand truck according to claim 8 wherein the second wheel set is closest to a third distal end of the back plate.

10. The stair-climbing hand truck according to claim 9 wherein the first wheel set is positioned between the second wheel set and the primary set of wheels.

11. The stair-climbing hand truck according to claim 10 wherein the second wheel set is separated a secondary distance from the first wheel set.

12. The stair-climbing hand truck according to claim 11 wherein the first wheel set is separated from the primary set of wheels via a third distance.

13. The stair-climbing hand truck according to claim 12 wherein the first wheel set, the second wheel set, and the primary set of wheels are collectively linearly aligned.

14. The stair-climbing hand truck according to claim 13 wherein the primary set of wheels is affixed to a primary axle; wherein the primary axle is supported underneath the back plate via a pair of primary brackets.

15. The stair-climbing hand truck according to claim 14 wherein a curved brace is affixed to both the back plate and the vertical frame in order to further rigidify the stair-climbing hand truck.

* * * * *